United States Patent
Sun et al.

(10) Patent No.: US 10,343,202 B2
(45) Date of Patent: Jul. 9, 2019

(54) METHOD FOR SYNCHRONOUSLY PROCESSING DUAL BELT MATERIALS

(71) Applicant: CHENGDU HOMIN TECHNOLOGY CO., LTD, Chengdu (CN)

(72) Inventors: Daojun Sun, Chengdu (CN); Guofu Tian, Chengdu (CN); Jian You, Chengdu (CN); Yan Zhuang, Chengdu (CN); Jiazhen Gong, Chengdu (CN); Junjie Guo, Chengdu (CN); Zhouyan Wang, Chengdu (CN)

(73) Assignee: CHENGDU HOMIN TECHNOLOGY CO., LTD., Chengdu (CN)

( * ) Notice: Subject to any disclaimer, the term of this patent is extended or adjusted under 35 U.S.C. 154(b) by 320 days.

(21) Appl. No.: 15/328,033

(22) PCT Filed: May 25, 2016

(86) PCT No.: PCT/CN2016/083232
§ 371 (c)(1),
(2) Date: Jan. 22, 2017

(87) PCT Pub. No.: WO2016/188420
PCT Pub. Date: Dec. 1, 2016

(65) Prior Publication Data
US 2017/0216898 A1  Aug. 3, 2017

(30) Foreign Application Priority Data
May 28, 2015 (CN) .......................... 2015 1 0281430

(51) Int. Cl.
*B21D 22/02* (2006.01)
*B21D 43/00* (2006.01)
(Continued)

(52) U.S. Cl.
CPC .............. *B21C 51/00* (2013.01); *B21D 22/02* (2013.01); *B21D 37/00* (2013.01); *B21D 43/003* (2013.01);
(Continued)

(58) Field of Classification Search
CPC ....... B23P 19/04; B23P 19/002; B23P 19/004; B23P 19/006; B23P 19/008; B23P 19/08; B21D 43/003; B21D 43/02; B21D 53/14
See application file for complete search history.

(56) References Cited

U.S. PATENT DOCUMENTS 4,627,265 A * 12/1986 Bulso, Jr. ............. B21D 51/383
72/356
5,375,513 A * 12/1994 Michael ................. B21D 35/00
100/346

FOREIGN PATENT DOCUMENTS

CN 203265461 U 11/2013
CN 204122631 U 1/2015
(Continued)

*Primary Examiner* — Christopher J Besler
(74) *Attorney, Agent, or Firm* — Gokalp Bayramoglu

(57) ABSTRACT

The present invention discloses a method for synchronously processing dual belt materials. The method comprises steps of feeding, processing, detecting, assembling and outputting finished products. The step of feeding materials comprises cleaning, dividing materials, positioning and feeding. The step of assembling comprises pushing and assembling. A dual-belt-material feeder is used for feeding, and a dual-belt-material mold is used for punching. The dual-belt-material feeder (1) comprises a moving feeding device (11), a fixed feeding device (13) and two guide frames (14). The dual-belt-material mold comprises two punching molds. The beneficial effects of the method for synchronously processing dual belt materials are that: the method can be used for producing thin wall miniature assembly parts in a single line and assembling the thin wall miniature assembly parts on (Continued)

line, so that problems caused by that the thin wall miniature assembly parts are produced in two production lines can be avoided.

5 Claims, 1 Drawing Sheet

(51) Int. Cl.
  *B23P 19/04* (2006.01)
  *B21D 53/14* (2006.01)
  *B23P 19/08* (2006.01)
  *B23P 19/00* (2006.01)
  *B21C 51/00* (2006.01)
  *B21D 43/02* (2006.01)
  *B21D 37/00* (2006.01)

(52) U.S. Cl.
  CPC .............. *B21D 43/02* (2013.01); *B21D 53/14* (2013.01); *B23P 19/04* (2013.01); *B23P 19/008* (2013.01); *B23P 19/08* (2013.01)

(56) References Cited

FOREIGN PATENT DOCUMENTS

| | | |
|---|---|---|
| CN | 104525762 A | 4/2015 |
| CN | 104985072 A | 10/2015 |
| EP | 0803302 A1 | 10/1997 |

\* cited by examiner

METHOD FOR SYNCHRONOUSLY PROCESSING DUAL BELT MATERIALS

CROSS REFERENCE TO RELATED APPLICATIONS

This application is the national phase entry of International Application No. PCT/CN2016/083232, filed on May 25, 2016, which is based upon and claims priority to Chinese Patent Application No. 201510281430.X filed on May 28, 2015, the entire contents of which are incorporated herein by reference.

TECHNICAL FIELD

The present invention relates to a production method, in particular to a method for synchronously processing dual belt materials.

BACKGROUND ART

Under the conditions of the prior art, only certain kind of parts can be produced in a single line when small parts are produced. There is a need to arrange multiple equipments to produce various parts, and finished-product parts are finally obtained by manual assembly. Therefore, such production method is low in efficiency, high in energy consumption, long in auxiliary time and large in occupied area of equipment, and defects of parts are hardly found to cause poor yield.

SUMMARY OF INVENTION

Technical Problem

The present invention aims to overcome the defects of the prior art and provide a feeding and dual-mould processing method which can be used for performing production in multiple lines synchronously and online assembly by using a dual-belt-material feeder.

Solution to the Problem

Technical Solution

The objective of the present invention is realized by the following technical solution: a method for synchronously processing dual belt materials is used for processing dual belt materials using a dual-belt-material feeder. The dual-belt-material feeder comprises a movable feeding device, a fixed feeding device and two guide frames, wherein the movable feeding device and the fixed feeding device are mounted between the two guide frames; each guide frame is provided with a sliding chute; the movable feeding device is provided with two guide blocks which are mounted in the sliding chutes; two air cylinders are mounted above the movable feeding device; the movable feeding device is internally provided with pressing plate grooves; a pressing plate is mounted on a piston rod of each air cylinder and is located in the corresponding pressing plate groove; in the same way, two air cylinders are mounted above the fixed feeding device, the fixed feeding device is internally provided with pressing plate grooves, a pressing plate is mounted on a piston rod of each air cylinder, and the pressing plates are located in the pressing plate grooves; the dual-belt-material feeder is mounted in a pit formed in the conveying line;

The dual-belt-material feeder comprises two punching moulds;

The method for synchronously processing dual belt materials comprises the following steps:

S1. feeding: conveying two different blanks into the punching moulds through the dual-belt-material feeder, comprising the following substeps:

S11. cleaning: cleaning burrs of blanks and sundries on surfaces thereof;

S12. dividing materials: dividing the two different blanks equidistantly;

S13. positioning: in a feeding process, clamping the two different blanks with the movable feeding device and the fixed feeding device to realize positioning;

S14. feeding: moving the two different blanks orderly and quantitatively by combined use of the movable feeding device and the fixed feeding device;

S2. processing: moving parts to the punching moulds, punching the parts with a punching mechanism, wherein the movable feeding device and the fixed feeding device drive the blanks to feed by one feed amount, and accordingly, the processed parts move forward by a length of one feed amount;

S3. detecting: detecting whether the quality of the parts is qualified or not;

S4. assembling: assembling different parts on line, comprising the following substeps:

S41. pushing: removing one of the parts and pushing the removed part to a position below the other part;

S42. assembling: press-fitting the two parts together; and

S5. outputting finished products: collecting the assembled parts.

The bottom of the pressing plate groove and the topmost position of the conveying line are on the same horizontal plane.

The processing and detecting are performed synchronously, and the processing and assembling are performed synchronously.

BENEFICIAL EFFECTS OF THE INVENTION

Beneficial Effects

The beneficial effects of the method for synchronously processing dual belt materials are that: the method can be used for producing thin wall miniature assembly parts in a single line and assembling the thin wall miniature assembly parts on line, so that problems caused by that the thin wall miniature assembly parts are produced in two production lines can be avoided, the problems may be that devices need configuring in the two production lines, occupation space of devices is large, the energy consumption is large, the production efficiency is low, the thin wall miniature assembly parts need assembling by manual work after processing, workers' labor intensity is large, the time for assembling is long, the work efficiency is affected, parts is easy to damage, and damaged parts are hard to find. The processing precision of parts can be improved and the yield can be ensured by detecting whether the parts are pushed in place in a process of pushing the parts.

BRIEF DESCRIPTION OF THE DRAWINGS

Description of the Drawings

Figure 1:
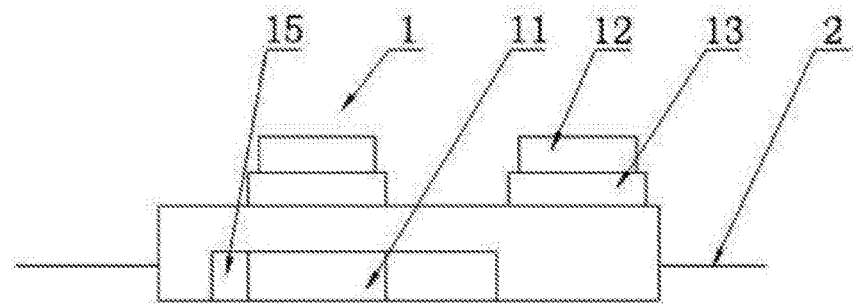
Figure 2:
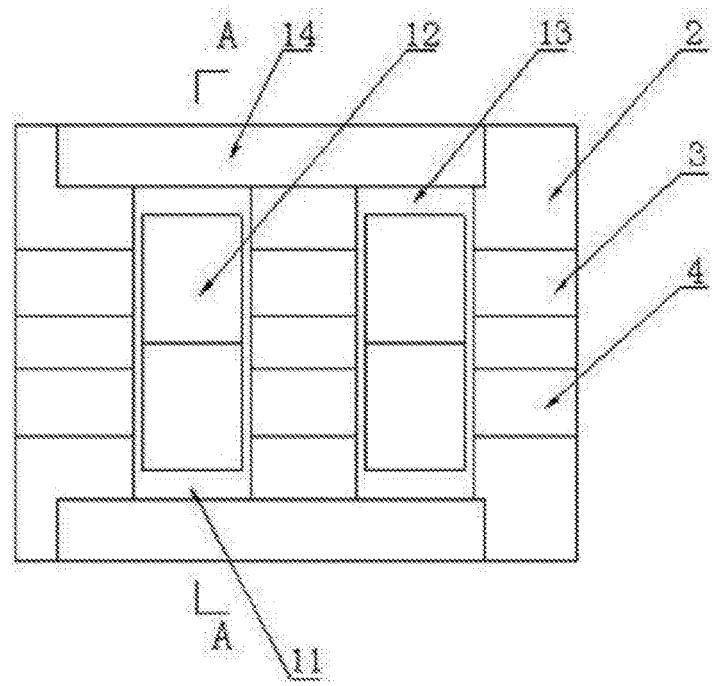
Figure 3:
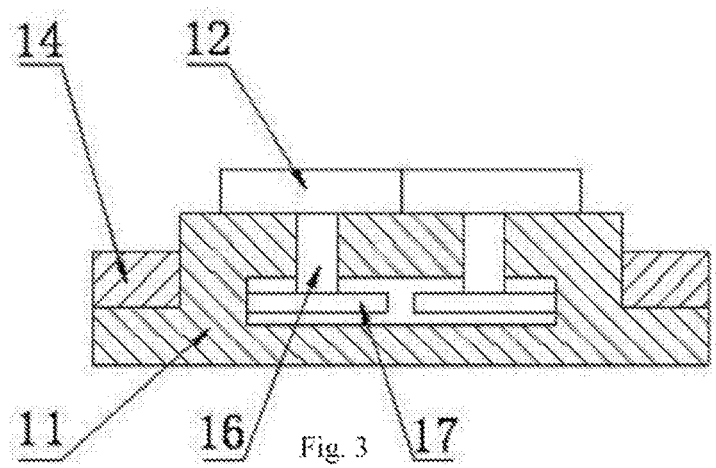

FIG. 1 is a front view of the dual-belt-material feeder;
FIG. 2 is a top view of a dual-belt-material feeder; and FIG. 3 is an A-direction sectional view of a dual-belt-material feeder;

In drawings, dual-belt-material feeder 1, movable feeding device 11, air cylinder 12, fixed feeding device 13, guide frame 14, sliding chute 15, piston rod 16, pressing plate 17, guide block 18, pressing plate groove 19, conveying line 2, blank A 3 and blank B 4 are marked.

DETAILED DESCRIPTION OF INVENTION

Implementations of the Invention

The present invention will be further described as below in conjunction with the drawings. The protection scope of the present invention is not limited to the following content:

As shown in FIG. 1, FIG. 2 and FIG. 3, dual-belt-material feeder 1 comprises movable feeding device 11, fixed feeding device 13 and two guide frames 14, wherein movable feeding device 11 and fixed feeding device 13 are mounted between two guide frames 14; each guide frame 14 is provided with sliding chute 15; movable feeding device 11 is provided with two guide blocks 18 which are mounted in sliding chutes 15; two air cylinders 12 are mounted above movable feeding device 11; movable feeding device 11 is internally provided with pressing plate grooves 19; pressing plate 17 is mounted on piston rod 16 of each air cylinder 12 and is located in corresponding pressing plate groove 19; in the same way, two air cylinders 12 are mounted above fixed feeding device 13, fixed feeding device 13 is internally provided with pressing plate grooves 19, pressing plate 17 is mounted on piston rod 16 of each air cylinder 12, and pressing plates 17 are located in pressing plate grooves 19; dual-belt-material feeder 1 is mounted in a pit formed in conveying line 2. The bottom of pressing plate groove 19 and the topmost position of conveying line 2 are located on the same horizontal plane;

Dual moulds include punching mould A for processing blank A3 and punching mould B for processing blank B4, wherein blank A and blank B4 are different in material, width and thickness;

A working process of the present invention is as follows:

Embodiment 1: a method for synchronously processing dual belt materials comprises the following steps:

S1. feeding: conveying two different blanks into the punching moulds through the dual-belt-material feeder, comprising the following substeps:

S11. cleaning: removing burrs on blank A3 and blank B4 and sundries on surfaces thereof by fixedly mounting a hairbrush above blank A3 and blank B4;

S12. dividing materials: in this embodiment, dividing two different blanks equidistantly and guiding the same to a designated moving orbit by arranging a smooth and wear-resistant cylinder between the two different blanks;

S13. positioning: in the feeding processing, clamping and positioning the two different blanks by controlling the movable feeding device and the fixed feeding device through a pneumatic system, wherein the pneumatic system is configured to control the movable feeding device and the fixed feeding device to realize clamping, with clamping reliability, fast response and flexible actions, such that loosening clamping and other works can be finished rapidly;

S14. feeding; in this embodiment, feeding the blanks by combined use of movable feeding device 11 and fixed feeding device 13, wherein movable feeding device 11 clamps blank A3 and blank B4. Blanks of different thicknesses are clamped by controlling the elongation rate of piston rod 16, the air cylinder which controls movable feeding device 11 to move in a horizontal direction drives movable feeding device 11 to move towards fixed feeding device 13, and at this moment, pressing plate 17 of fixed feeding device 13 does not contact blank A3 and blank B4. When being in contact, blank A3 and blank B4 are clamped by movable feeding device 11 to move forward. When movable feeding device 11 moves one station forward, pressing plate 17 of fixed feeding device 13 contacts and presses blank A3 and blank B4, pressing plate 17 of movable feeding device 11 is separated from blank A3 and blank B4 and moves one station in a direction away from fixed feeding device 13 tinder the action of the air cylinder which controls movable feeding device 11 to move in a horizontal direction, and by this point, once feeding is finished;

S2. processing: punching blank A3 and blank B4 by punching mechanism in conjunction with punching mould A and punching mould B;

S3. detecting: detecting whether the quality of the parts is qualified or not;

S4. assembling: assembling different parts on line, comprising the following substeps:

S41. pushing: pushing part processed from blank A3 to a position below part processed from blank B4;

S42. assembling: press-fitting the two parts together by applying a pressure in a vertical direction; and S5: outputting finished products: collecting the assembled parts.

What is claimed is:

1. A method for synchronously processing dual belt materials using a dual-belt-material feeder, the method comprising the following steps:

providing the dual-belt-material feeder, wherein the dual-belt-material feeder comprises a movable feeding device, a fixed feeding device and two guide frames; wherein the movable feeding device and the fixed feeding device are mounted between the two guide frames; each of the two guide frames are provided with a sliding chute; the movable feeding device is provided with two guide blocks which are mounted in the sliding chutes; two air cylinders are mounted above the movable feeding device; the movable feeding device is internally provided with pressing plate grooves; a pressing plate is mounted on a piston rod of each of the two air cylinders and is located in a corresponding one of the pressing plate grooves; in the same way, the two air cylinders are mounted above the fixed feeding device, the fixed feeding device is internally provided with the pressing plate grooves, the pressing plate is mounted on the piston rod of each of the two air cylinders, and the pressing plate is located in the pressing plate grooves; the dual-belt-material feeder is mounted in a pit formed in a conveying line; and a plurality of dual-band-material molds including two punching molds;

S1. feeding: conveying two different blanks into the two punching molds through the dual-belt-material feeder, comprising the following substeps:

S11. cleaning: removing burrs and sundries on surfaces of the two different blanks;

S12. dividing materials: dividing the two different blanks;

S13. positioning: clamping the two different blanks with the movable feeding device and the fixed feeding device to realize positioning;

S14. feeding: moving the two different blanks orderly and quantitatively by combined use of the movable feeding device and the fixed feeding device;

S2. processing: moving parts to the two punching molds, and punching the parts with a punching mechanism, wherein the movable feeding device and the fixed feeding device drive the two different blanks to feed by one feed amount, and accordingly, the parts move forward by a length of one feed amount;

S3. detecting: detecting whether a quality of the parts is qualified or not;

S4. assembling: assembling the parts on line, comprising the following substeps:

S41. pushing: removing a first part of the parts and pushing the first part to a position below a second part of the parts;

S42. assembling: press-fitting the first and second parts together; and

S5: outputting finished products: collecting the parts.

2. The method for synchronously processing dual belt materials according to claim 1, wherein a bottom of the pressing plate groove and a topmost position of the conveying line are on a same horizontal plane.

3. The method for synchronously processing dual belt materials according to claim 1, wherein the processing and the detecting are performed synchronously, and the processing and the assembling are performed synchronously.

4. The method for synchronously processing dual belt materials according to claim 1, wherein, in S14, the movable feeding device damps the two different blanks.

5. The method for synchronously processing dual belt materials according to claim 1, wherein, in S14, the two different blanks are clamped by controlling an elongation rate of the piston rod.

* * * * *